US009128193B2

(12) United States Patent
Wang et al.

(10) Patent No.: US 9,128,193 B2
(45) Date of Patent: Sep. 8, 2015

(54) TWO-AXIS APPARATUS WITH STATIONARY POSITIONING, ROTATING AND/OR SCANNING MOTION OF POINT OR LINE SOURCES

(71) Applicants: Zhengyan Wang, Antioch, IL (US); Wenli Wang, Briarcliff Manor, NY (US); Karthikayan Balakrishnan, Vernon Hills, IL (US)

(72) Inventors: Zhengyan Wang, Antioch, IL (US); Wenli Wang, Briarcliff Manor, NY (US); Karthikayan Balakrishnan, Vernon Hills, IL (US)

(73) Assignees: Kabushiki Kaisha Toshiba, Tokyo (JP); Toshiba Medical Systems Corporation, Otawara-shi (JP)

( * ) Notice: Subject to any disclaimer, the term of this patent is extended or adjusted under 35 U.S.C. 154(b) by 206 days.

(21) Appl. No.: 13/653,103

(22) Filed: Oct. 16, 2012

(65) Prior Publication Data

US 2014/0103200 A1    Apr. 17, 2014

(51) Int. Cl.
*G01T 1/20* (2006.01)
*G01T 1/164* (2006.01)

(52) U.S. Cl.
CPC ............. *G01T 1/1648* (2013.01); *G01T 1/20* (2013.01)

(58) Field of Classification Search
CPC .......................................... G01T 1/20
USPC .......................... 250/252.1, 363.02
See application file for complete search history.

(56) References Cited

U.S. PATENT DOCUMENTS

| 4,817,038 A  * | 3/1989 | Knoll et al. ............... 250/363.09 |
| 7,193,220 B1 * | 3/2007 | Navarro ......................... 250/374 |
| 2010/0198063 A1* | 8/2010 | Huber et al. ................... 600/437 |

* cited by examiner

*Primary Examiner* — David Porta
*Assistant Examiner* — Faye Boosalis
(74) *Attorney, Agent, or Firm* — Oblon, McClelland, Maier & Neustadt, L.L.P.

(57) ABSTRACT

An apparatus and method for simulating a radiation phantom so as to calibrate or measure performance of a gamma detection system. The apparatus includes a line bar configured to rotate around an axis of rotation, a source carriage configured to move linearly along the line bar and to hold an attached radiation source, and a fixture assembly configured to support the line bar, the fixture assembly being configured to attach to a patient bed.

18 Claims, 6 Drawing Sheets

TWO-AXIS APPARATUS WITH STATIONARY POSITIONING, ROTATING AND/OR SCANNING MOTION OF POINT OR LINE SOURCES

BACKGROUND

1. Field

Embodiments described herein relate to Positron Emission Tomography (PET) and Single Photon Emission Computer Tomography (SPECT).

2. Background

In Positron Emission Tomography (PET) and Single Photon Emission Computed Tomography (SPECT), a fixture is used routinely to accurately position a radioactive phantom (e.g., point source, line source, cylinder source, etc.) in the scanner's imaging field-of-view (FOV) to fulfill certain calibration or performance measurements. In some cases, the patient support assembly/bed is required to be out of the scanner's FOV during measurement. This fixture is attached to the patient bed or stands directly on the floor, and is used to hold the phantom in the required position with respect to the scanner FOV.

A PET/SPECT normalization apparatus has been proposed to emulate a plane source by moving a line source across the scanner's transverse or axial FOV. A three-dimensional (3D) positioning robot has been proposed to position a point source precisely along (x, y, z) axes in the PET scanner FOV for point-spread-function (PSF) measurement to improve PET image resolution.

Other measurements (e.g., time-of-flight timing calibration, NEMA resolution and sensitivity measurement) also require a fixture to position a point source or a line source in a precise location within the FOV.

Typically, separate fixtures are designed to hold different phantoms for different calibration and performance measurements. For example, the fixture that holds the scanning line source is different from the fixture that holds the stationary point source for PSF measurement.

BRIEF DESCRIPTION OF THE DRAWINGS

The disclosure will be better understood from reading the description which follows and from examining the accompanying figures. These figures are provided solely as non-limiting examples of the embodiments. In the drawings.

DETAILED DESCRIPTION

In one embodiment, there is provided an apparatus for simulating a radiation phantom so as to calibrate or measure performance of a gamma detection system. The apparatus includes a line bar configured to rotate around an axis of rotation; a source carriage configured to move linearly along the line bar and to hold an attached radiation source; and a fixture assembly configured to support the line bar, the fixture assembly being configured to attach to a patient bed. In one embedment, the apparatus further includes a scanning motor configured to control motion of the source carriage along the line bar; and a rotational motor configured to control rotational motion of the line bar around the axis of rotation.

In one embodiment, the apparatus further includes a processor configured to control the scanning motor to position the source carriage at a set linear position along the line bar, wherein the processor is further configured to control the scanning motor to move the source carriage at a set linear speed; the processor is further configured to control the rotational motor to rotate the line bar to a set angular position; and the processor is further configured to control the rotational motor to rotate the line bar at a set angular slew rate.

In one embodiment, the apparatus further includes a position sensor configured to detect a position of the source carriage along the line bar, wherein the processor is configured to control the scanning motor to position the source carriage at the set linear position along the line bar based on the detected position of the source carriage.

In one embodiment, the apparatus further includes a rotation sensor configured to detect an angular position of the line bar, wherein the processor is configured to control the rotational motor to rotate the line bar to the set angular position based on the detected angular position.

In one embodiment, the source carriage is configured to hold a line radiation source; and the processor is configured to control the scanning motor to move the source carriage back and forth along the line bar so as to simulate a plane source.

In one embodiment, the processor is configured to move the source carriage back and forth along the line bar at a sweep slew rate through a linear field of view having a central offset for a sweep duration time, wherein the sweep slew rate, the linear field of view, the central offset, and the sweep duration time are adjustable by an operator. In one embodiment, the processor is further configured to control the rotational motor to rotate the line bar to the set angular position so as to simulate a tilted plane source.

In one embodiment, the source carriage is configured to hold a line radiation source; and the processor is configured to control the scanning motor to move the source carriage to the set linear position and to control the rotational motor so that the rotational motor rotates the line bar around the axis of rotation so as to simulate a shell source.

In one embodiment, the source carriage is configured to hold a line radiation source; and the processor is configured to simultaneously control the scanning motor and the rotational motor so that the rotational motor rotates the line bar while the scanning motor changes the linear position of the source carriage so as to simulate a cylinder source.

In one embodiment, the source carriage is configured to hold a point radiation source. In one embodiment, the source carriage is configured to hold a line radiation source. In one embodiment, the fixture assembly has six degrees of freedom.

In one embodiment, there is provided a method for controlling an apparatus that simulates a radiation phantom so as to calibrate or measure performance of a gamma detection system, the apparatus including a line bar configured to rotate around an axis of rotation, and a source carriage configured to move linearly along the line bar and to hold an attached radiation source. The method includes attaching a line radiation source to the source carriage; and controlling a scanning motor to move the source carriage back and forth along the line bar so as to simulate a plane source.

In one embodiment, the method further includes setting a sweep slew rate, a linear field of view, a central offset, and a sweep duration time; and moving the source carriage back and forth along the line bar at the set sweep slew rate through the set linear field of view having the set central offset for the set sweep duration time.

In one embodiment, the method further includes controlling a rotational motor to rotate the line bar to a set angular position so as to simulate a tilted plane source.

In one embodiment, the method further includes detecting an angular position of the line bar; and controlling the rotational motor to rotate the line bar to the set angular position based on the detected angular position.

In one embodiment, there is provided a method for controlling an apparatus that simulates a radiation phantom so as to calibrate or measure performance of a gamma detection system, the apparatus including a line bar configured to rotate around an axis of rotation, and a source carriage configured to move linearly along the line bar and to hold an attached radiation source. The method includes attaching a line radiation source using the source carriage; and controlling a scanning motor to move the source carriage to a set linear position and to control a rotational motor so that the rotational motor rotates the line bar around the axis of rotation so as to simulate a shell source.

In one embodiment, the method further includes detecting a position of the source carriage along the line bar; and controlling the scanning motor to position the source carriage at the set linear position along the line bar based on the detected position of the source carriage.

In one embodiment, there is provided a method for controlling an apparatus that simulates a radiation phantom so as to calibrate or measure performance of a gamma detection system, the apparatus including a line bar configured to rotate around an axis of rotation, and a source carriage configured to move linearly along the line bar and to hold an attached radiation source. The method includes attaching a line radiation source using the source carriage; and simultaneously controlling a scanning motor and a rotational motor so that the rotational motor rotates the line bar while the scanning motor changes a linear position of the source carriage so as to simulate a cylinder source.

Figure 1:
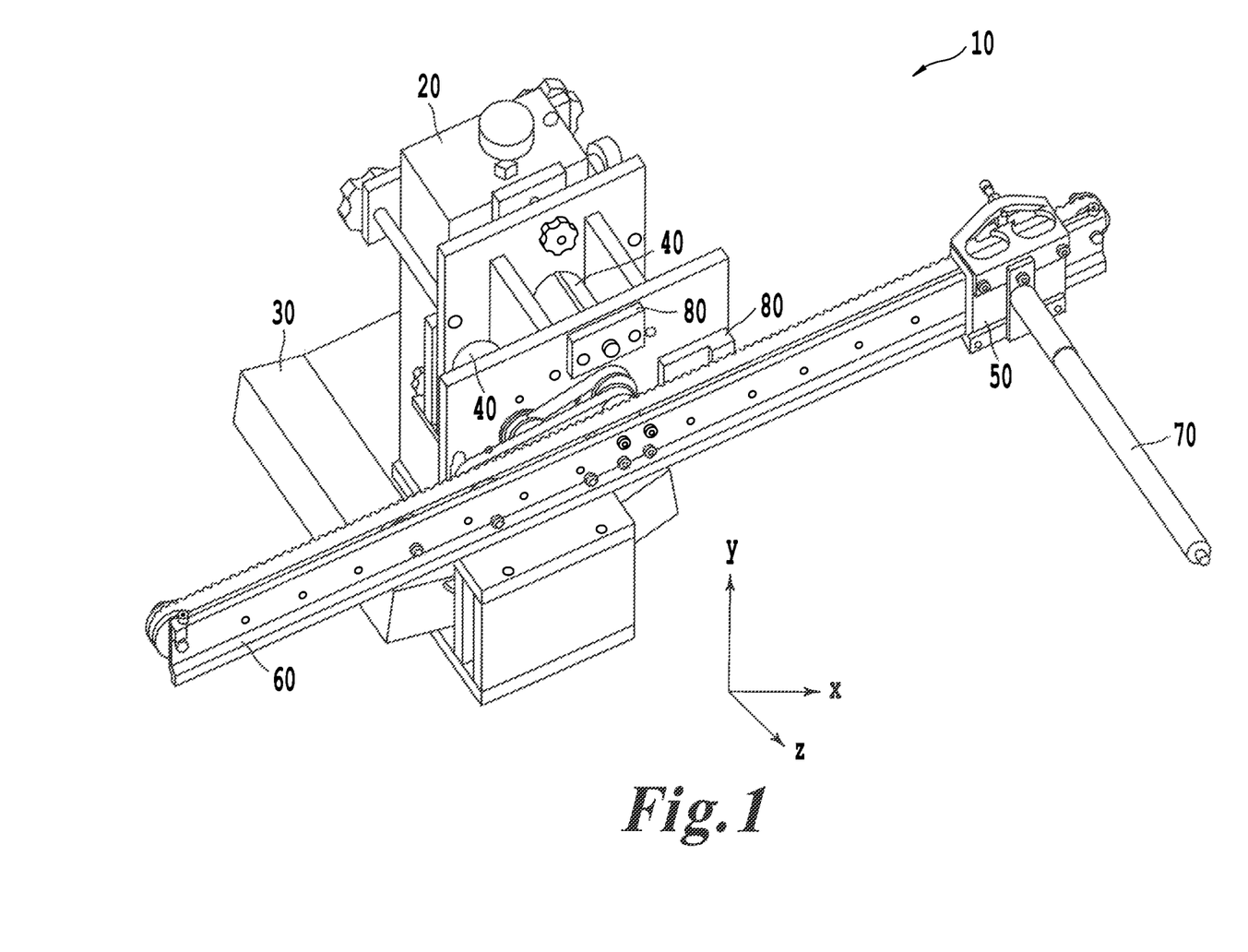
FIGS. 1-3 illustrate different views of an apparatus according to one embodiment.

Turning now to the drawings, FIG. 1 illustrates a two-axis (rotational axis and linear axis) fixture or apparatus 10 that holds a point or line source, with separate scanning or rotational motion, or combined scanning and rotational motion. The apparatus 10 can be applied to PET/SPECT system calibration or performance measurement, and to Computed Tomography (CT) with non-radioactive source (e.g., to simulate complex respiratory motion of a lesion or cardiac motion of a defect).

Figure 2:
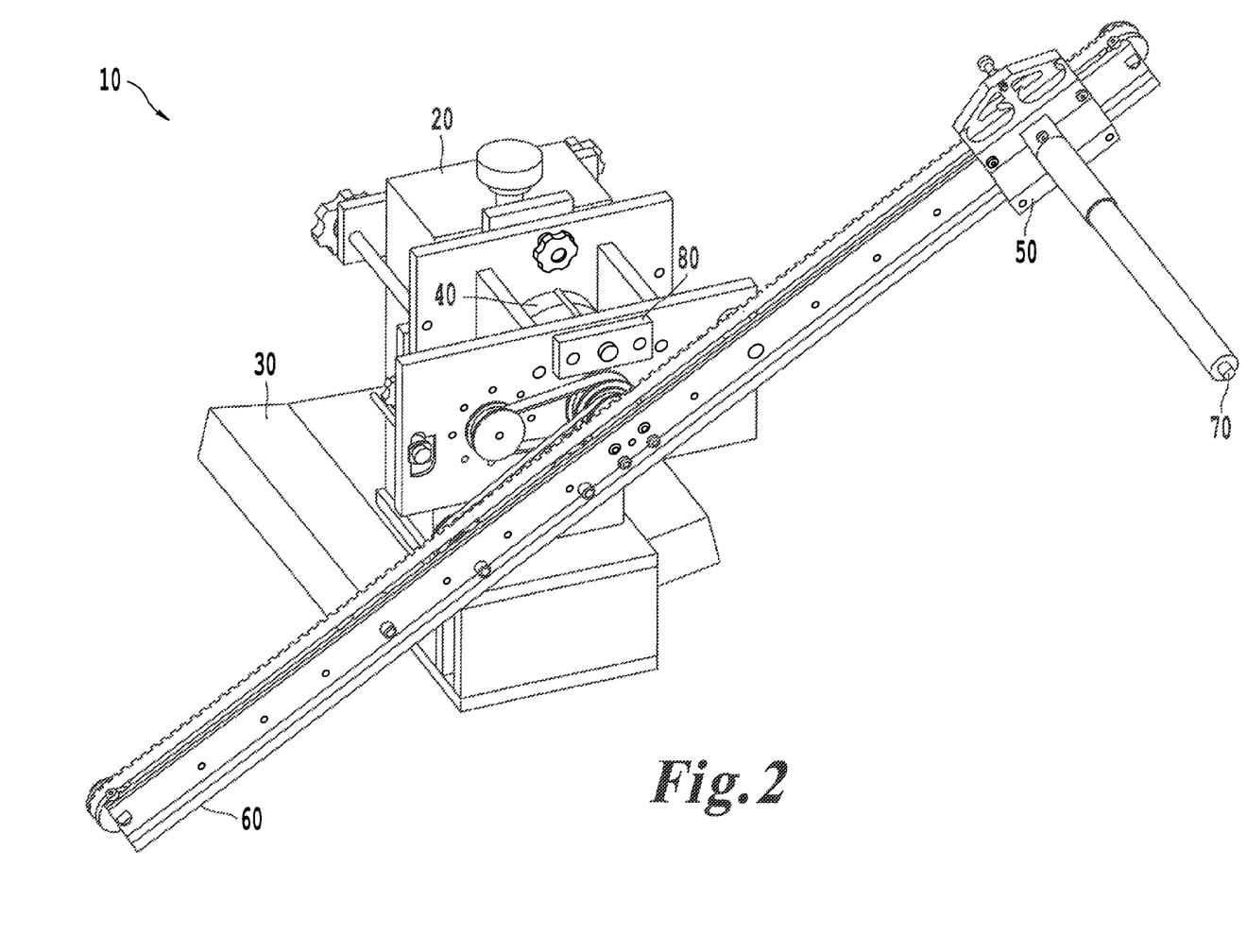
Figure 3:
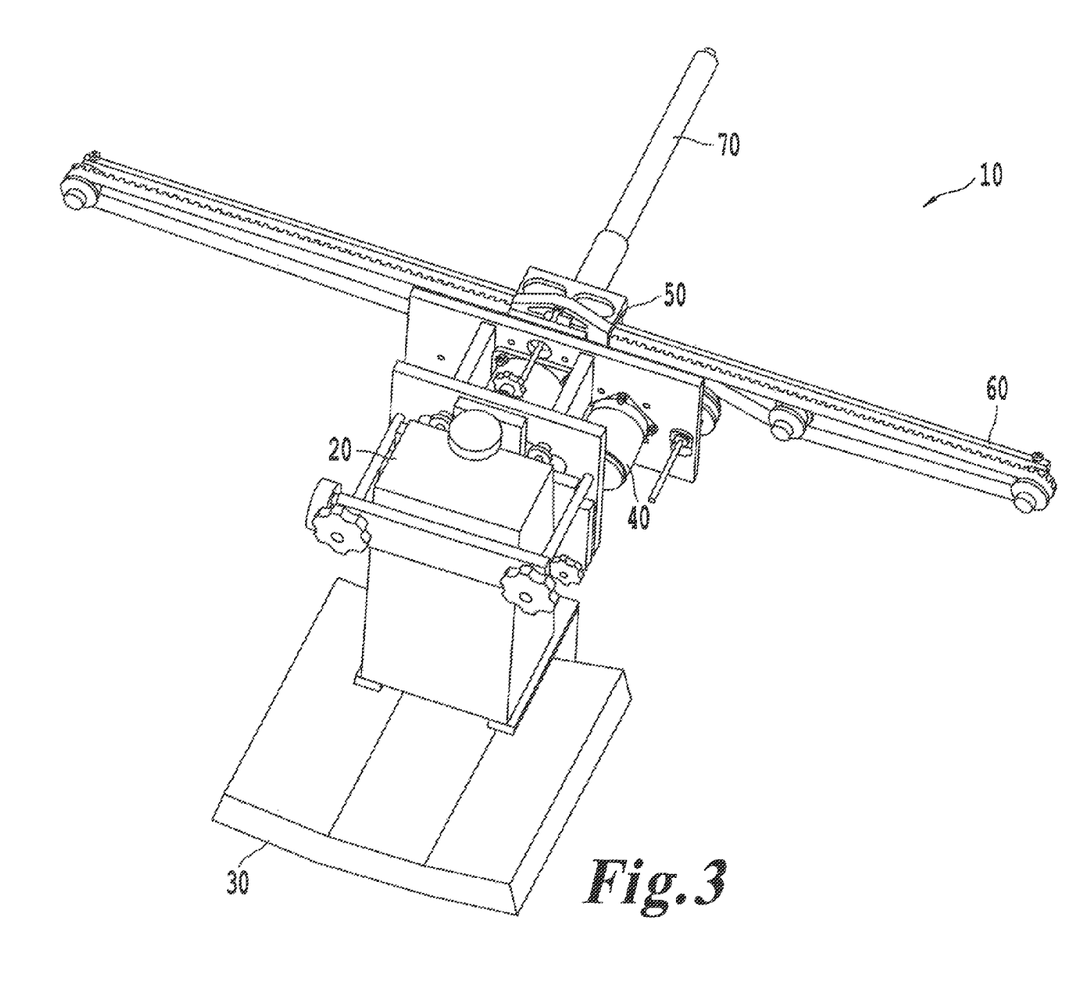

As shown in FIGS. 1-3, the apparatus 10 includes a fixture assembly 20 that is attached to a patient bed 30 and is adjustable in the (x, y, z) directions, with a total of six degrees of freedom (three translation and three rotation). The apparatus 10 also includes a motor assembly 40 and a scanning motor, which controls linear scanning motion of the source carriage 50 along line bar assembly 60. The apparatus 10 may be attached at an end of the patient bed 30, as shown in FIGS. 1-3.

The apparatus 10 further includes a rotational motor that controls rotation motion of the line bar assembly 60 around the z-axis. The line bar assembly 60 attaches the source carriage 50 and has an adjustable target angle for the stationary mode, and an adjustable angular slew rate (deg/sec) for the rotational mode. The source carriage 50 attaches radiation source 70, and has an adjustable target linear position for the stationary mode and an adjustable linear range and linear speed for the stationary mode.

The apparatus 10 also includes two sensors 80, one of which is located on the line bar assembly 60 and the other mounted on the fixture assembly 20. The sensors 80 detect the linear position of the source carriage 50 and the angle of the line bar assembly 60. A controller performs position feedback control based on the outputs of the sensors and angular and positional set points.

The apparatus 10, in particular the scanning motor and the rotational motor, is controlled by a processing apparatus (controller), such as a personal computer (PC) or other computing device. Features of the processing apparatus are discussed below with reference to FIG. 8.

Figure 4A:
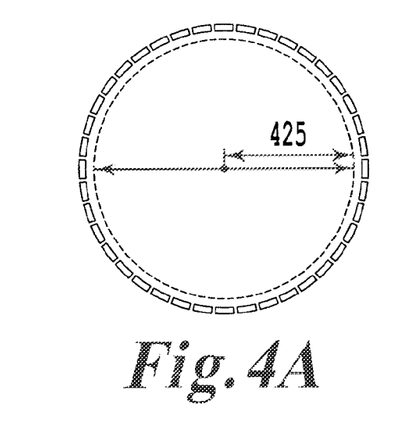
FIGS. 4A and 4B illustrate the apparatus emulating a plane source for PET geometric normalization calibration.
Figure 4B:
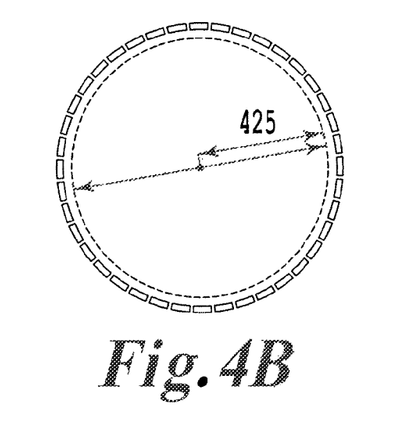

In FIGS. 4A and 4B, to emulate a plane source for PET geometric normalization calibration, the apparatus 10 holds a line source, and sweeps the source along its linear axis. The linear FOV, sweep slew rate, central FOV offset, and sweep duration time are set by an operator via the processing apparatus. Compared with a real plane source, the emulated plane source has minimum scatter and attenuation. The linear axis of the apparatus 10 can rotate to any angle with respect to the scanner's axial axis, and cause the plane source to rotate to any angle with respect to the scanner's axial axis.

Figure 5:
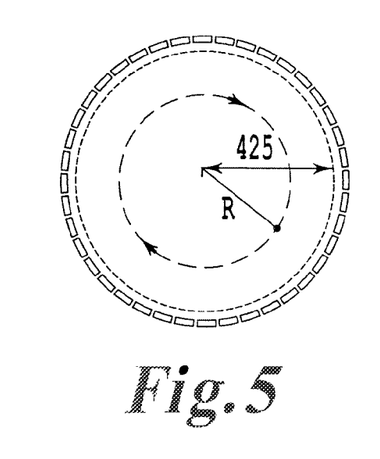
FIG. 5 illustrates the apparatus emulating a shell source for PET geometric normalization calibration.

In FIG. 5, to emulate a shell source for PET geometric normalization calibration, the apparatus 10 holds a line source, moves the source to a linear target position (i.e., radius (R) of the shell), and rotates the source around the central axial axis of the apparatus 10. The linear target position, the angular sweep slew rate, and duration time of the rotation can all be controlled by the processing apparatus.

The emulated shell source can also be used to acquire attenuation information when a CT scanner or the transmission source device is unavailable. Furthermore, compared with a real shell source, the emulated shell source has minimum scatter and attenuation.

Figure 6A:
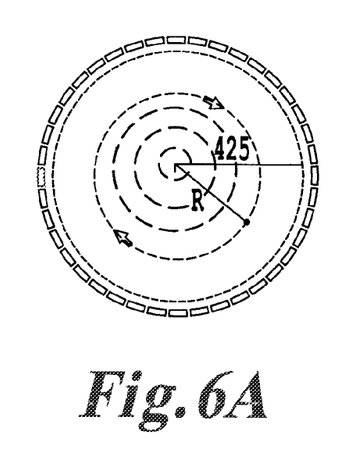
FIGS. 6A and 6B show the apparatus emulating a cylindrical source for PET crystal efficiency normalization calibration.
Figure 6B:
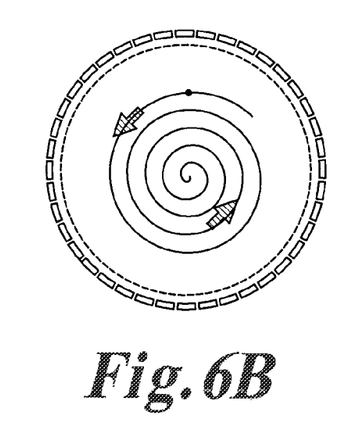

With regard to FIGS. 6A and 6B, to emulate a cylinder source for PET crystal efficiency normalization calibration, the apparatus 10 holds a line source, and moves the source in both linear and rotational directions in a predetermined pattern. Compared with a real cylinder source, the emulated cylinder source has minimum attenuation and scatter.

For PSF calibration measurement, the apparatus 10 is aligned centered in the PET FOV, holds a point source, and moves the source into a specific (x, y) position with both linear and rotation movement. The axial location of the point source is achieved by moving the patient bed 30 to where the apparatus 10 is attached.

Alternatively, an optional axial linear motion of the apparatus 10 is added to position the point accurately in the z-direction. Furthermore, the point source can be moved into new positions automatically by pre-programmed settings.

Figure 7:
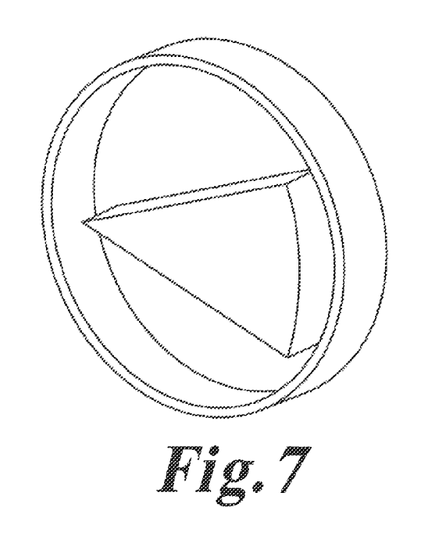
FIG. 7 illustrates the apparatus for PET timing calibration measurement.

With regard to FIG. 7, for PET timing calibration measurement, the apparatus 10 holds a point or line source centered in z-axis, and moves the source into a specific (x, y) position with both linear and rotation movement. Furthermore, if needed, the point or line source can be moved into new positions automatically by pre-programmed settings.

The apparatus 10 discussed above provides several advantages over conventional systems. For example, linear scan motion and angular rotational motion can be combined and performed by one programmable device. In addition, the apparatus 10 is flexible and can simulate various geometry phantoms, compared with 3-orthogonal linear scan motion.

The apparatus 10 is also more versatile than other conventional apparatuses and more cost efficient. As discussed above, the apparatus 10 is able to position a point or line source precisely in a specific location in the FOV, scan a point or line source to emulate a line or plane source with any tilted angle with respect to the horizontal x-axis (e.g., for normalization calibration), and rotate a point or line source to emulate a circle or shell source to investigate how the line of response (LOR) emission position affects normalization. Furthermore, the apparatus 10 is also able to scan and rotate a line source to emulate a cylinder or other 3D volume phantom.

Figure 8:
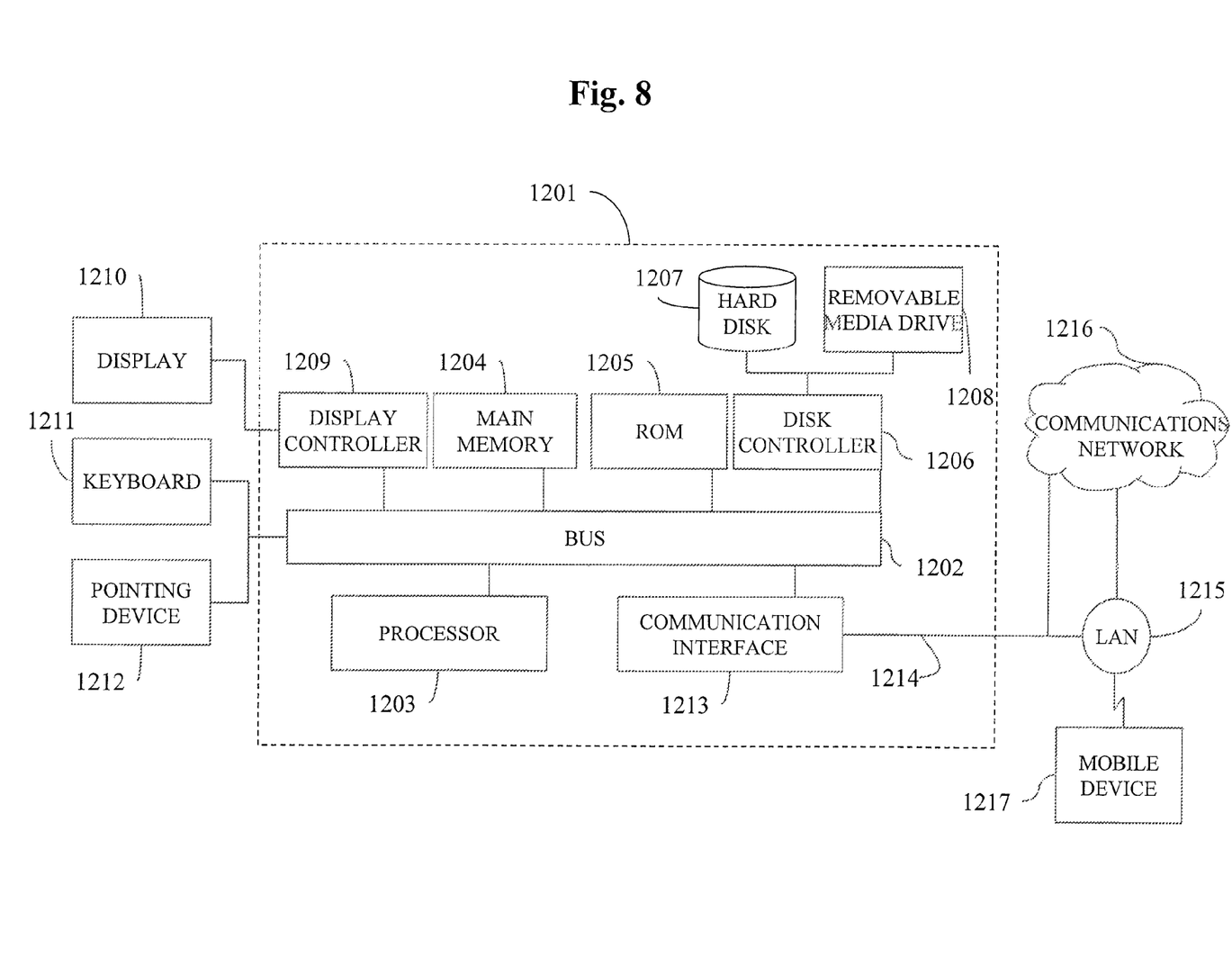
FIG. 8 illustrates a computer system that may be used to control the apparatus and upon which embodiments of the present disclosure may be implemented.

As discussed above, the apparatus 10 can be controlled using a computer processing apparatus or programmable logic. FIG. 8 illustrates a computer system 1201 that functions as a controller configured to control, for example, motors that engage the apparatus 10. An operator may, for example, set various parameters (e.g., set angle, set linear position, set slew rate, etc.) via a user interface, and a processor (for example, processor 1203) of computer system 1201 may control the apparatus 10 via an interface based on the set parameters.

The computer system 1201 includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1201 may also include a display controller 1209 coupled to the bus 1202 to control a display 1210, for displaying information to a computer user. The computer system includes input devices, such as a keyboard 1211 and a pointing device 1212, for interacting with a computer user and providing information to the processor 1203. The pointing device 1212, for example, may be a mouse, a trackball, a finger for a touch screen sensor, or a pointing stick for communicating direction information and command selections to the processor 1203 and for controlling cursor movement on the display 1210.

The processor 1203 executes one or more sequences of one or more instructions contained in a memory, such as the main memory 1204. Such instructions may be read into the main memory 1204 from another computer readable medium, such as a hard disk 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 includes at least one computer readable medium or memory for holding instructions programmed according to the teachings of the present disclosure and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes.

Stored on any one or on a combination of computer readable media, the present disclosure includes software for controlling the computer system 1201, for driving a device or devices for implementing the invention, and for enabling the computer system 1201 to interact with a human user. Such software may include, but is not limited to, device drivers, operating systems, and applications software. Such computer readable media further includes the computer program product of the present disclosure for performing all or a portion (if processing is distributed) of the processing performed in implementing the invention.

The computer code devices of the present embodiments may be any interpretable or executable code mechanism, including but not limited to scripts, interpretable programs, dynamic link libraries (DLLs), Java classes, and complete executable programs. Moreover, parts of the processing of the present embodiments may be distributed for better performance, reliability, and/or cost.

The term "computer readable medium" as used herein refers to any non-transitory medium that participates in providing instructions to the processor 1203 for execution. A computer readable medium may take many forms, including but not limited to, non-volatile media or volatile media. Non-volatile media includes, for example, optical, magnetic disks, and magneto-optical disks, such as the hard disk 1207 or the removable media drive 1208. Volatile media includes dynamic memory, such as the main memory 1204. Transmission media, on the contrary, includes coaxial cables, copper wire and fiber optics, including the wires that make up the bus 1202. Transmission media also may also take the form of acoustic or light waves, such as those generated during radio wave and infrared data communications.

Various forms of computer readable media may be involved in carrying out one or more sequences of one or more instructions to processor 1203 for execution. For example, the instructions may initially be carried on a magnetic disk of a remote computer. The remote computer can load the instructions for implementing all or a portion of the present disclosure remotely into a dynamic memory and send the instructions over a telephone line using a modem. A modem local to the computer system 1201 may receive the data on the telephone line and place the data on the bus 1202. The bus 1202 carries the data to the main memory 1204, from which the processor 1203 retrieves and executes the instructions. The instructions received by the main memory 1204 may optionally be stored on storage device 1207 or 1208 either before or after execution by processor 1203.

The computer system 1201 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a network interface card to attach to any packet switched LAN. As another example, the communication interface 1213 may be an integrated services digital network (ISDN) card. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc.). The signals through the various networks and the signals on the network link 1214 and through the communication interface 1213, which carry the digital data to and from the computer system 1201 may be implemented in baseband signals, or carrier wave based signals. The baseband signals convey the digital data as unmodulated electrical pulses that are descriptive of a stream of digital data bits, where the term "bits" is to be construed broadly to mean symbol, here each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214 and the communication interface 1213. Moreover, the network link 1214 may provide a connection through a LAN 1215 to a mobile device 1217 such as a personal digital assistant (PDA) laptop computer, or cellular telephone.

While certain embodiments have been described, these embodiments have been presented by way of example only, and are not intended to limit the scope of the inventions. Indeed the novel methods and systems described herein may be embodied in a variety of other forms; furthermore, various omissions, substitutions, and changes in the form of the methods and systems described herein may be made without departing from the spirit of the inventions. The accompanying claims and their equivalents are intended to cover such forms or modifications as would fall within the scope and spirit of the inventions.

The invention claimed is:

1. An apparatus for simulating a radiation phantom so as to calibrate or measure performance of a gamma detection system, comprising:
a line bar configured to rotate around an axis of rotation;
a source carriage configured to move linearly along the line bar and to hold an attached radiation source;
a fixture assembly configured to support the line bar, the fixture assembly being configured to attach to a patient bed;
a rotational motor configured to control rotational motion of the line bar around the axis of rotation; and
a processor configured to control the rotational motor to rotate the line bar at a set angular slew rate.

2. The apparatus of claim 1, further comprising:
a scanning motor configured to control motion of the source carriage along the line bar.

3. The apparatus of claim 2, wherein
the processor is further configured to control the scanning motor to position the source carriage at a set linear position along the line bar,
the processor is further configured to control the scanning motor to move the source carriage at a set linear speed, and
the processor is further configured to control the rotational motor to rotate the line bar to a set angular position.

4. The apparatus of claim 3, further comprising:
a position sensor configured to detect a position of the source carriage along the line bar,
wherein the processor is configured to control the scanning motor to position the source carriage at the set linear position along the line bar based on the detected position of the source carriage.

5. The apparatus of claim 3, further comprising:
a rotation sensor configured to detect an angular position of the line bar,
wherein the processor is configured to control the rotational motor to rotate the line bar to the set angular position based on the detected angular position.

6. The apparatus of claim 3, wherein the source carriage is configured to hold a line radiation source; and
the processor is configured to control the scanning motor to move the source carriage back and forth along the line bar so as to simulate a plane source.

7. The apparatus of claim 6, wherein the processor is configured to move the source carriage back and forth along the line bar at a sweep slew rate through a linear field of view having a central offset for a sweep duration time, wherein the sweep slew rate, the linear field of view, the central offset, and the sweep duration time are adjustable by an operator.

8. The apparatus of claim 6, wherein the processor is further configured to control the rotational motor to rotate the line bar to the set angular position so as to simulate a tilted plane source.

9. The apparatus of claim 3, wherein the source carriage is configured to hold a line radiation source; and
the processor is configured to control the scanning motor to move the source carriage to the set linear position and to control the rotational motor so that the rotational motor rotates the line bar around the axis of rotation so as to simulate a shell source.

10. The apparatus of claim 3, wherein the source carriage is configured to hold a line radiation source; and
the processor is configured to simultaneously control the scanning motor and the rotational motor so that the rotational motor rotates the line bar while the scanning motor changes the linear position of the source carriage so as to simulate a cylinder source.

11. The apparatus of claim 1, wherein the source carriage is configured to hold a point radiation source.

12. The apparatus of claim 1, wherein the source carriage is configured to hold a line radiation source.

13. The apparatus of claim 1, wherein the fixture assembly has six degrees of freedom.

14. A method for controlling an apparatus that simulates a radiation phantom so as to calibrate or measure performance of a gamma detection system, the apparatus including a line bar configured to rotate around an axis of rotation, and a source carriage configured to move linearly along the line bar and to hold an attached radiation source, the method comprising:
attaching a line radiation source to the source carriage;
controlling a scanning motor to move the source carriage back and forth along the line bar so as to simulate a plane source;
setting a sweep slew rate, a linear field of view, a central offset, and a sweep duration time; and
moving the source carriage back and forth along the line bar at the set sweep slew rate through the set linear field of view having the set central offset for the set sweep duration time.

15. The method of claim 14, further comprising:
controlling a rotational motor to rotate the line bar to a set angular position so as to simulate a tilted plane source.

16. The method of claim 15, further comprising:
detecting an angular position of the line bar; and
controlling the rotational motor to rotate the line bar to the set angular position based on the detected angular position.

17. A method for controlling an apparatus that simulates a radiation phantom so as to calibrate or measure performance of a gamma detection system, the apparatus including a line bar configured to rotate around an axis of rotation, and a source carriage configured to move linearly along the line bar and to hold an attached radiation source, the method comprising:

attaching a line radiation source using the source carriage;
controlling a scanning motor to move the source carriage to a set linear position and to control a rotational motor so that the rotational motor rotates the line bar around the axis of rotation so as to simulate a shell source;
detecting a position of the source carriage along the line bar; and
controlling the scanning motor to position the source carriage at the set linear position along the line bar based on the detected position of the source carriage.

18. A method for controlling an apparatus that simulates a radiation phantom so as to calibrate or measure performance of a gamma detection system, the apparatus including a line bar configured to rotate around an axis of rotation, and a source carriage configured to move linearly along the line bar and to hold an attached radiation source, the method comprising:

attaching a line radiation source using the source carriage; and
simultaneously controlling a scanning motor and a rotational motor so that the rotational motor rotates the line bar while the scanning motor changes a linear position of the source carriage so as to simulate a cylinder source.

* * * * *